Jan. 7, 1969   F. W. FORK   3,420,018
UNDERFLOOR ELECTRICAL CROSSUNDER UNIT
Filed Oct. 18, 1967   Sheet 1 of 3

INVENTOR
FRANK W. FORK
BY George E. Manias
AGENT

Jan. 7, 1969　　　　　　　F. W. FORK　　　　　　　3,420,018

UNDERFLOOR ELECTRICAL CROSSUNDER UNIT

Filed Oct. 18, 1967　　　　　　　　　　　　　　Sheet 2 of 3

INVENTOR
FRANK W. FORK

BY George E. Manias

AGENT

INVENTOR
FRANK W. FORK

AGENT

United States Patent Office 3,420,018
Patented Jan. 7, 1969

3,420,018
UNDERFLOOR ELECTRICAL CROSSUNDER UNIT
Frank W. Fork, Allison Park, Pa., assignor to H. H. Robertson Company, Pittsburgh, Pa., a corporation of Pennsylvania
Filed Oct. 18, 1967, Ser. No. 676,217
U.S. Cl. 52—221        8 Claims
Int. Cl. E04b 5/48

ABSTRACT OF THE DISCLOSURE

A wiring crossunder arrangement for a wiring distributing system of a building floor including a main electrical trench and laterally extending cellular raceways disposed at the same level as the trench. The crossunder unit is disposed beneath the trench and defines transverse wiring passageways which communicate with the cellular raceways and the trench.

BACKGROUND OF THE INVENTION (1) *Field of the invention.*—This invention relates to an underfloor electrical wiring distributing system incorporating a main electrical trench header, and more particularly, to an underfloor electrical crossunder unit providing continuity of electrical wiring passage between the main electrical trench header and at least one feeder cellular raceway unit extending laterally of the electrical trench header.

(2) *Description of the prior art.*—The provision of underfloor electrical raceways in modern buildings is a standard construction. The use of metal cellular flooring for this purpose is well known in the art. See, for example, U.S. Patent 2,445,197. The provision of electrical trench headers and raceways in poured concrete flooring similarly is well known in the art. See for example, U.S. Patents 3,204,378, 3,237,356 and 3,262,238.

In all floor constructions wherein electrical trenches are combined with underfloor raceways, such as metal cellular flooring, the trench header passes over the raceways, that is, the trench header and the raceways lie in separate vertically spaced horizontal levels. Such a system is known in the prior art as a two level arrangement. In many instances it is undesirable, and in some instances it is impossible, to use this two level arrangement because the depth of the floor becomes excessive.

Many modern buildings are provided with reinforced concrete floor constructions which do not employ metal cellular flooring. Such reinforced concrete flooring has a relatively shallow depth and is normally provided with a waffle shaped lower face thereby to increase its load carrying capacity. Cellular raceway units are presently available for use in such reinforced concrete flooring constructions. A cellular raceway unit presents a plurality of spaced, generally parallel, enclosed cells which serve as raceways for electrical wiring.

Heretofore, the relatively shallow depth of reinforced concrete flooring has precluded the use of cellular raceway units in conjunction with electrical trench headers.

SUMMARY OF THE INVENTION

The principal object of the present invention is to provide an underfloor electrical crossunder unit which permits the use of electrical trench headers in conjunction with cellular raceway units in reinforced concrete floor constructions.

Another object of the present invention is to provide a crossunder unit which may be factory installed or field installed to the electrical trench header.

The present invention provides an electrical crossunder unit for use in conjunction with an electrical trench header and feeder cellular raceway units which extend laterally away from the trench header. The electrical trench header normally includes a generally U-shaped base pan having a flat web and upstanding sidewalls. The feeder cellular raceway units provide a plurality of spaced-apart generally parallel enclosed cells serving as raceways for the wiring of various electrical services.

In accordance with the present invention, the base pan of the trench header and the feeder cellular raceway units lie at a common level. The present electrical crossunder unit comprises a corrugated member disposed beneath the base pan and cooperating with the flat web thereof to form transverse raceways extending transversely of the trench header. The corrugated member presents at least one first corrugated end portion projecting laterally beyond the sidewall of the base pan. The cellular raceway unit presents a second corrugated end portion which overlaps the first corrugated end portion. Means is provided for enclosing the overlapping first and second corrugated end portions so as to provide direct communication between the feeder cells of the feeder cellular raceway unit and corresponding transverse raceways of the present crossunder unit. The flat web of the base pan has at least one opening formed therein which provides communication from the interior of the trench header through a subjacent one of the transverse raceways to the corresponding one of the enclosed feeder cells.

The present electrical crossunder unit is usable at an "X" intersection wherein the feeder cellular raceway units extend laterally away from each side of the electrical trench header. In this arrangement, wiring may extend continuously through one feeder cellular raceway unit beneath the electrical trench header and thence through the other feeder cellular raceway unit, or through either feeder cellular raceway unit and through the aforesaid opening into the electrical trench header.

The present electrical crossunder unit is also usable at a "T" intersection wherein only one feeder cellular raceway unit extends laterally away from the electrical trench header.

DESCRIPTION OF THE PREFERRED EMBODIMENT(S)

Figure 1:
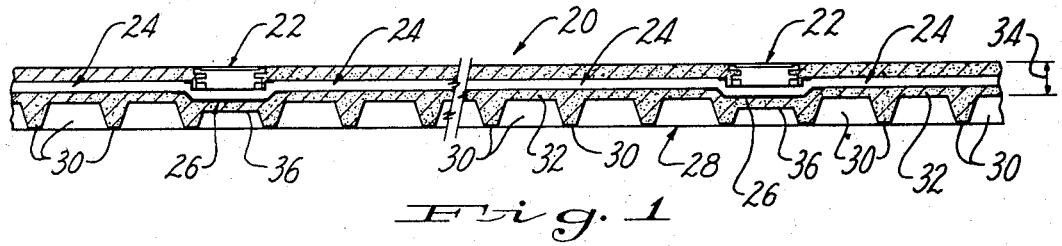
FIGURE 1 is a transverse cross-sectional view of a building floor incorporating electrical trench headers, feeder cellular raceway units and crossunder units of the present invention.

Referring now to FIGURE 1, there is illustrated a typical reinforced concrete floor 20 incorporating electrical trench headers 22; feeder cellular raceway units 24 extending between the electrical trench headers 22; and electrical crossunder units 26 of the present invention positioned beneath the electrical trench headers 22. The typical reinforced concrete floor 20 has a waffle-shaped lower face 28 providing a plurality of intersecting beams 30 and webs 32 extending between adjacent beams. The concrete floor 20 has a normal web thickness indicated at 34 and thickened webs 36 in those locations of the concrete floor 20 wherein the present crossunder units 26 are installed.

The electrical trench header 22 may comprise units described and illustrated in U.S. Patents 3,237,356 and 3,262,238.

Figure 2:
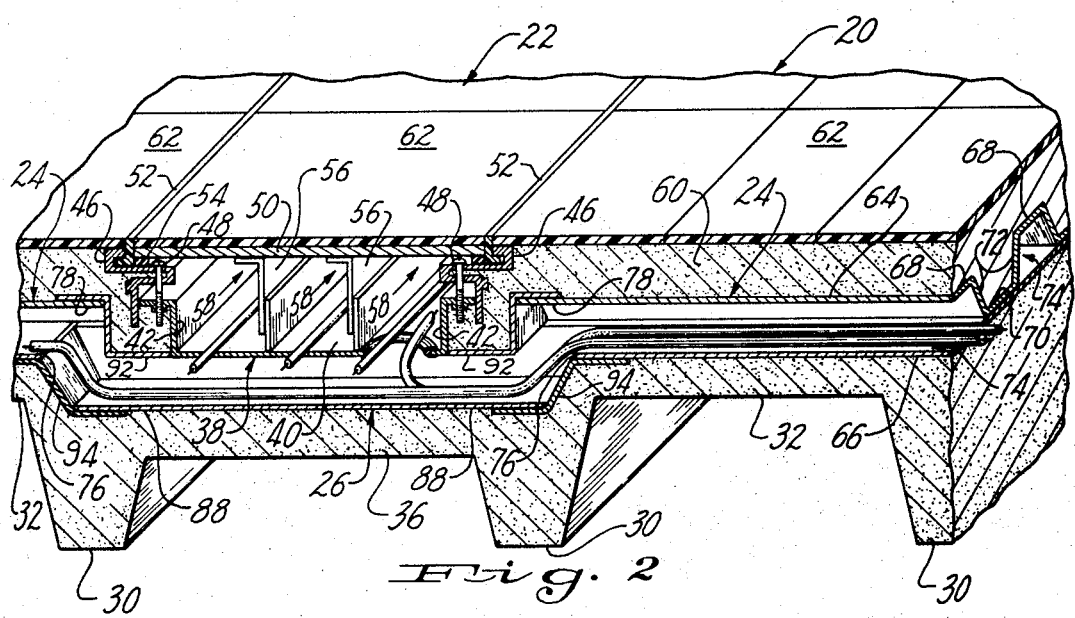
FIGURE 2 is a fragmentary isometric view of a portion of the building floor of FIGURE 1 on an enlarged scale.
Figure 3:
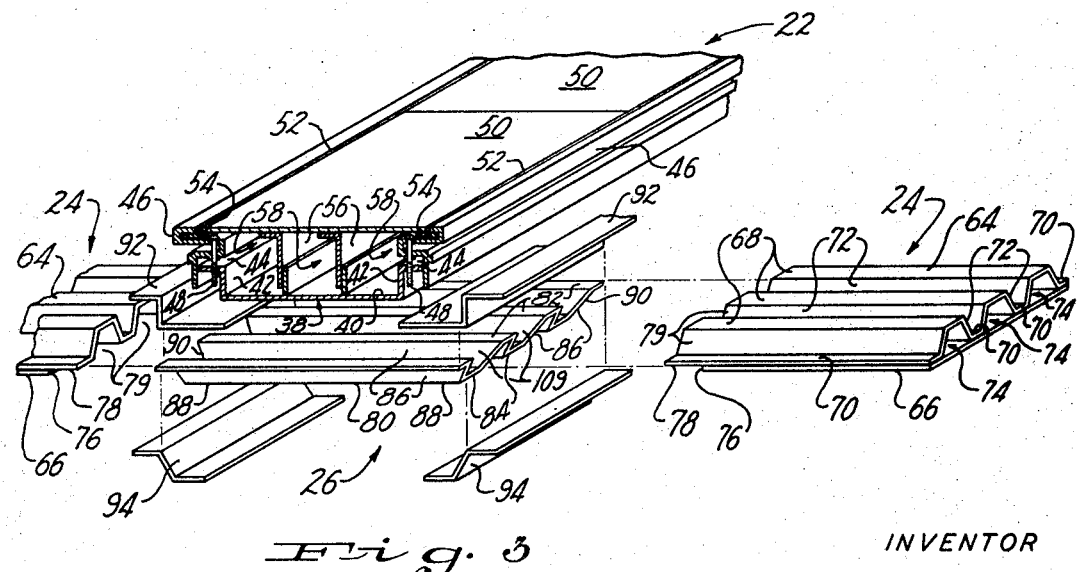
FIGURE 3 is a fragmentary exploded isometric view illustrating the electrical trench header, the feeder cellular raceway units and the present crossunder unit.

For the purposes of the present invention, it is believed sufficient to state that with reference to FIGURES 2 and 3, the electrical trench header 22 comprises a generally U-shaped base pan 38 having a generally flat web 40 and upstanding sidewalls 42 terminating in outwardly extending flanges 44; longitudinal side rails 46 disposed above the flanges 44 and connected thereto for vertical adjustment by leveling screws 48; and a plurality of access cover plates 50 spanning the distance between the longitudinal side rails 46 and disposed in end-to-end butting relation. The longitudinal side rails 46 carry reversible tile stops 52 and strip gaskets 54. Vertically adjustable partitioning members 56 are provided within the trench header 22 to divide its interior into main passageways 58 through which the electrical wiring of various electrical services may extend uninterruptedly along the length of the floor 20.

As shown in FIGURE 2, the electrical trench header 22 is surrounded by concrete 60 of the floor 20. The access cover plates 50 are flush with the upper surface of the floor 20. Normally a decorative coating 62 is provided above the concrete 60 and the access cover plates 50, for example, linoleum, asphalt tile, rubber tile, ceramic tile, carpeting and the like.

The cellular raceway units 24 preferably comprise that cellular raceway unit described and illustrated in copending application Ser. No. 625,755, filed Mar. 24, 1967 and assigned to the assignee of the present invention.

For the purposes of the present invention it is believed sufficient to state that with reference to FIGURE 3, the cellular raceway unit 24 comprises a corrugated upper metal sheet 64 and a flat lower metal sheet 66.

The upper metal sheet 64 has spaced crests 68, valleys 70 and inclined sidewalls 72 connecting adjacent crests and valleys. The lower metal sheet 66 has a generally rectangular configuration and is secured to the valleys 70 of the upper metal sheet 64 as by means of spot welding.

The lower metal sheet 66 cooperates with the spaced crests and inclined sidewalls 72 of the upper metal sheet 64 to form a plurality of spaced-apart generally parallel enclosed feeder cells 74 serving as raceways conveying the wiring of various electrical services, as will be described.

In accordance with the present invention, the lower metal sheet 66 terminates in an end edge 76 which is inwardly spaced from the adjacent edge of the upper metal sheet 64. The cellular raceway unit 24 thus presents a second corrugated end portion 78 which consists of only a segment of the upper metal sheet 64 and which terminates in open feeder cell ends 79 remote from the upstanding sidewall 42 of the base pan 32 and the adjacent longitudinal side rail 46. The second corrugated end portion 78 is open at its bottom.

Figure 4:
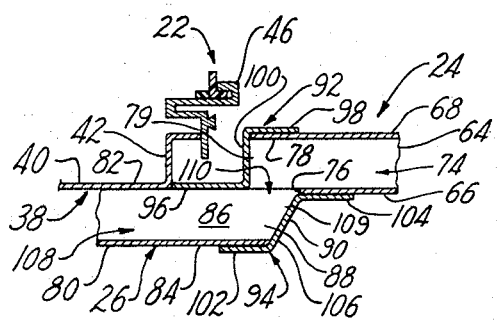
FIGURE 4 is an enlarged fragmentary view corresponding to components shown in FIGURE 1 with the concrete removed.

Referring now to FIGURES 3 and 4, the crossunder unit 26 of the present invention comprises a corrugated member 80 having spaced crests 82, valleys 84 and inclined sidewalls 86 connecting adjacent crests and valleys. The corrugated member 80 and the upper metal sheet 64 of the cellular raceway unit 24 are shown having identical configurations. The corrugated member 80 may comprise an inverted segment of sheet metal corresponding to the upper metal sheet 64.

The length of the corrugated member 80 is greater than the overall width of the electrical trench header 22. Thus, when the corrugated member 80 is secured to the flat web 40 of the base pan 38 as shown in FIGURES 2 and 4, the corrugated member 80 will have opposite first corrugated end portions 88 projecting beyond the sidewalls 42 of the base pan 38 and positioned to underlie the second corrugated end portions 78 of the cellular raceway units 24.

Referring now to FIGURE 4, the crossunder unit 26 also includes upper and lower flashing members 92, 94.

The upper flashing member 92 has a generally Z-shaped configuration including a leg 96 overlying the crest 82 of the first corrugated end portion 88; a leg 98 overlying the crests 68 of the second corrugated end portion 78; and a generally vertical web 100 connecting the legs 96, 98 and disposed in capping relation with the feeder cells 74 of the cellular raceway unit 24. The flashing member 92 may be secured in position by tack welds (not shown).

The lower flashing member 94 also has a generally Z-shaped configuration including a leg 102 underlying and secured to the valleys 84 of the second corrugated end portion 88; a leg 104 underlying and secured to the lower metal sheet 66 of the cellular raceway unit 24; and an inclined web 106 connecting the legs 102, 104 and engaging an inclined edge 90 of the first corrugated end portion 88.

The overall arrangement of the present crossunder unit 26 is such that the valleys 84 and inclined sidewalls 86 of the corrugated member 80 cooperate with the flat web 40 of the base pan 38 to define a plurality of transverse passageways 108. The first corrugated end portions 88 are open at their tops and terminate open transverse raceway ends 109. The overlapping first and second corrugated end portions 78, 88 cooperate with the upper and lower flashing members 92, 94 to define a plurality of access openings 110 providing direct communication between corresponding feeder cells 74 and transverse raceways 108.

Figure 6:
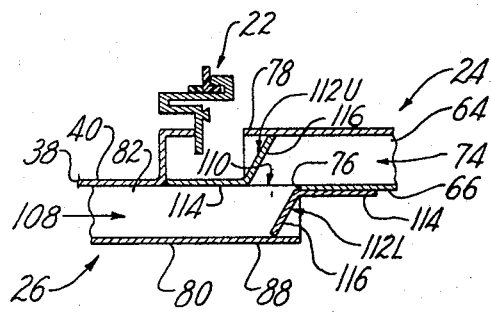
FIGURE 6 is a fragmentary cross-sectional view, similar to FIGURE 4, illustrating the use of the flashing member of FIGURE 5.
Figure 5:
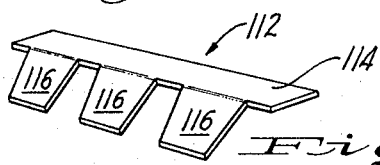
FIGURE 5 is a perspective view of an alternative embodiment of a flashing member employed in the present crossunder unit.

In the preferred arrangement, a flashing member 112, illustrated in FIGURE 5, comprises a flange 114 having a plurality of inclined tongues 116 corresponding to the profiles of the feeder cells 74 and the transverse raceways 108. Flashing members 112 may be employed to close both the transverse raceways 108 and the feeder cells 74. For example, as illustrated in FIGURE 6, the lower flashing member 112L has a flange 114 secured to the lower metal sheet 66 and inclined tongues 116 projecting into the transverse raceways 108. Similarly, an upper flashing member 112U has a flange 114 secured to the crests 82 of the corrugated member 80 and inclined tongues 116 projecting into the interior of the feeder cells 74 of the cellular raceway unit 24. Thus in the preferred embodiment, a single type of flashing member 112 is employed to cap the feeder cells 74 and the transverse raceways 108. It should also be noted that the flashing member 112 can be used without requiring that the end edges of the corrugated member 80 be cut on a bias, compare with the arrangement shown in FIGURE 4.

Figure 7:
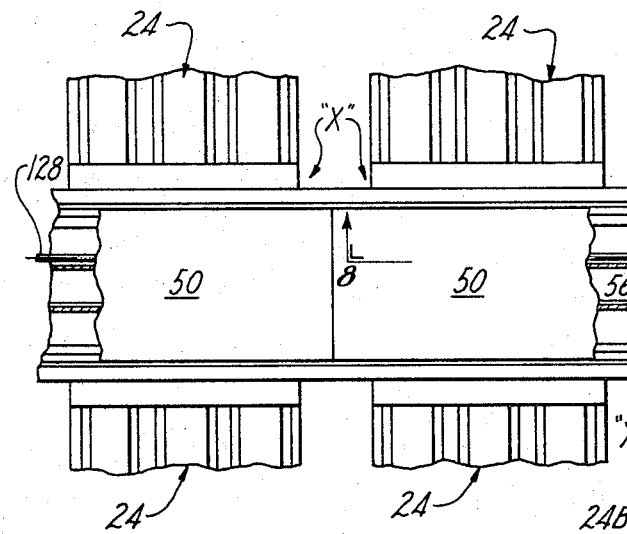
FIGURE 7 is a fragmentary plan view of an electrical trench header provided with a plurality of the present crossunder units and feeder cellular raceway units and illustrating various electrical wiring runs.
Figure 8:
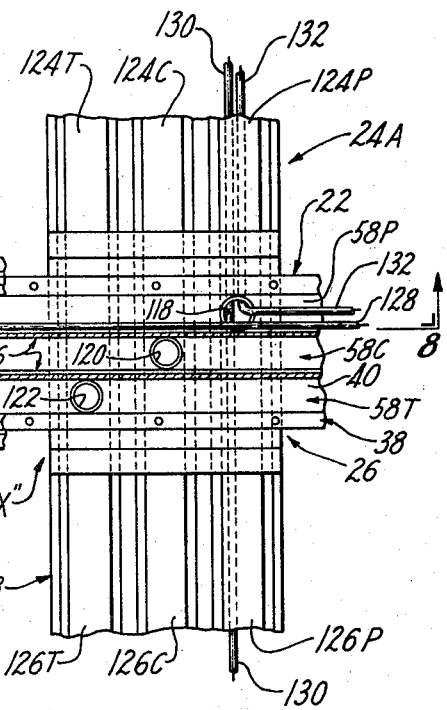
FIGURE 8 is a cross-sectional view taken along the line 8—8 of FIGURE 7.

In FIGURES 7 and 8, there is illustrated an "X" intersection wherein the electrical trench header 22 intersects the paths of two cellular raceway units 24A and 24B. The present crossunder unit 26 is positioned beneath the electrical trench header 22 and provides direct communication between the feeder cells of the cellular raceway units 24A, 24B. As illustrated, the electrical trench header 22 presents three main passageways 58, the feeder cellular raceway unit 24A presents three feeder cells 124, and the second feeder cellular raceway unit 24B presents three feeder cells 126, and the present crossunder unit 26 (FIGURE 8) presents three transverse passageways 108.

The various raceways of the electrical trench header 22, of the feeder cellular raceway units 24A, 24B and of the crossunder unit 26 are adapted to convey the electrical wiring of different electrical services, for example, telephone communications and power. The letters T, C and P have been added to the cell designations 58, 108, 124 and 126 to indicate the type of electrical wiring conveyed by each particular cell.

Grommeted openings 118, 120 and 122 are provided in the flat web 40 of the base pan 38. The grommeted openings 118, 120 and 122 reside, respectively, in the passageways 58T, 58C and 58P. The overall arrangement is such that, for example, the grommeted opening 118 provides direct communication between the main passageway 58P and the transverse raceway 108P which, in turn, communicates with the corresponding feeder cells 124P and 126P. Similarly, the grommeted openings 120, 122 provide direct communication between the main passageways 58C, 58T, respectively, and the transverse raceways 108C, 108T—these transverse raceways communicating with corresponding feeder cells 124C, 126C; and 124T, 126T, respectively.

For example, a first power cable 128 may extend uninterruptedly through the main passageway 58P of the electrical trench header 22. A second power cable 130 may extend uninterruptedly through the feeder cell 124P of the first cellular raceway unit 24A, through the transverse raceway 108P of the crossunder unit 26, and through the feeder cell 126P of the second cellular raceway unit 24B. And, a third power cable 132 may extend through the feeder cell 124P of the first cellular raceway unit 24A, into the transverse raceway 108P of the crossunder unit 26, through the grommeted opening 118 and into the main passageway 58P of the electrical trench header 22.

It should now be readily apparent that by removing one or more of the cover plates 50, access may be gained to the various electrical services for the purpose of redistributing the wiring, adding additional wiring and the like, as necessitated by changes in the electrical requirements of the floor. Inasmuch as the feeder cellular raceway units 24 and the base pan 38 of the electrical trench header 22 lie at a common level, the overall thickness of the finished concrete floor is not significantly increased by the addition of the present crossunder unit 26. Furthermore, the various electrical services are entirely segregated from one another such that the distribution of one electrical service does not interfere with the distribution of the other electrical services.

Figure 9:
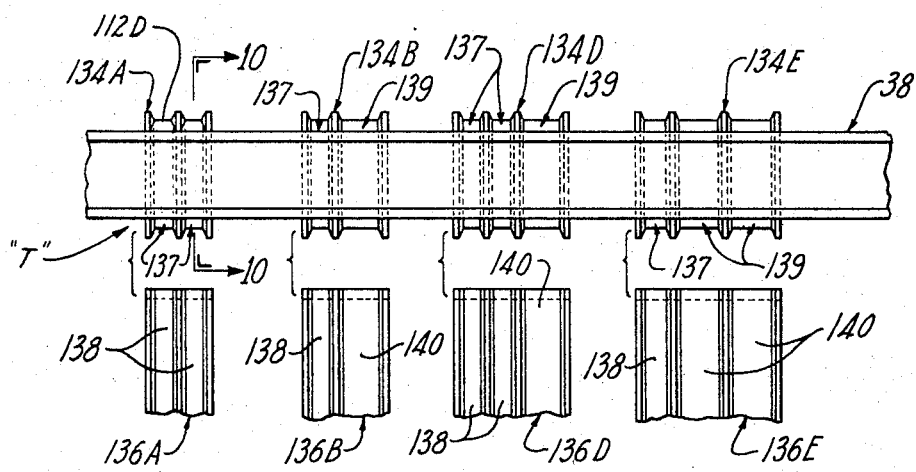
FIGURE 9 is a plan view, in exploded form, of an electrical trench header base pan provided with a number of the present crossunder units of various configurations and the corresponding feeder cellular raceway units used therewith.

The three-cell crossunder unit 26 and matching feeder cellular raceway unit 24 illustrate but one of a wide variety of arrangements. FIGURE 9 is a schematic plan view of a base pan 38 having a plurality of corrugated members, 134A, 134B, 136D and 136E secured thereto and further illustrating a plurality of matching feeder cellular raceway units 136A, 136B, 136D and 136E. The feeder cellular raceway unit 136A, for example, presents two identical feeder cells 138 which correspond with the transverse passageways 137 defined by the corrugated member 134A. The feeder cellular raceway unit 136B presents a small feeder cell 138 and a large feeder cell 140 which correspond with the transverse passageways 137, 139 defined by the corrugated member 134B. Other combinations of small and large feeder cells 138, 140 and transverse passageways 137, 139 are illustrated by the corrugated members 134D, 134E and the feeder cellular raceway units 136D, 136E.

The present crossunder unit may also be used at a "T" intersection, such as schematically illustrated in FIGURE 9, wherein the cellular raceway unit 136A is positioned for overlapping engagement with the corrugated member 134A. The opposite end of the corrugated member 134A is provided with the flashing member 112D.

Figure 10:
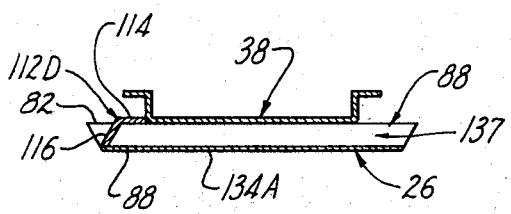
FIGURE 10 is a cross-sectional view taken along the line 10—10 of FIGURE 9.

As can be seen in FIGURE 10, the flashing member 112D has its flange 114 secured to the crests 82 of the corrugated member 134A and has its inclined tongues 116 closing the transverse raceways 137. The opposite first corrugated end portion 88 of the corrugated member 80 is open and positioned to be overlapped by the second corrugated end portion of a cellular raceway unit, as described above.

Figure 11:
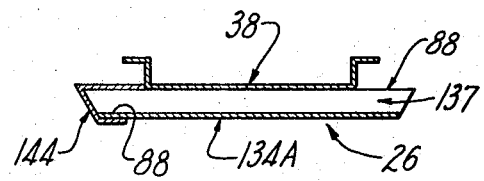
FIGURE 11 is a cross-sectional view similar to FIGURE 10, illustrating a further alternative embodiment of a flashing member.
Figure 12:
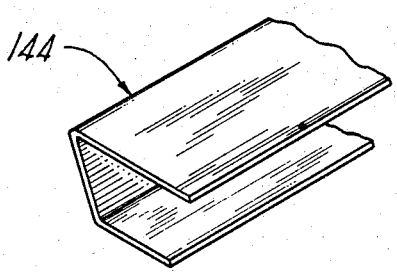
FIGURE 12 is a fragmentary perspective view of the flashing member of FIGURE 11.

Alternatively, the corrugated member 134A may be provided with a C-shaped cap 144, such as illustrated in FIGURE 12, for capping or closing the transverse raceways 137 in the manner shown in FIGURE 11.

What is claimed is:

1. In electrical wiring distributing apparatus for a concrete floor construction, said apparatus including a trench header having a base pan, vertically adjustable longitudinal side rails, and access cover plates spanning the distance between said longitudinal side rails, said base pan having a generally U-shaped configuration including a flat web and upstanding sidewalls, the improvement comprising:
   a corrugated member disposed beneath said base pan and cooperating with said flat web to form transverse raceways extending transversely of said trench header, said corrugated member having at least one first corrugated end portion projecting beyond one of said upstanding sidewalls, said first corrugated end portion being open at its top;
   a feeder cellular raceway unit having a plurality of spaced-apart generally parallel feeder cells extending laterally away from said trench header in aligned relation with said transverse raceways, said feeder cellular raceway unit presenting a second corrugated end portion open at its bottom and overlapping the open top of said first corrugated end portion; and
   said feeder cellular raceway unit and said base pan lying at a common level;
   said flat web having at least one opening providing communication from the interior of said trench header, through the subjacent one of said transverse raceways and into the corresponding feeder cell.

2. The improvement defined in claim 1 wherein said corrugated member is secured to said flat web of said base pan.

3. The improvement defined in claim 1 wherein said corrugated member is formed from sheet metal.

4. The improvement defined in claim 1 wherein said electrical trench header includes:
   partitioning means for dividing the interior of said trench header into a plurality of main passageways; and
   said flat web having openings, one in each of said passageways, said openings providing communication between each of said passageways and the corresponding subjacent one of said transverse raceways.

5. The improvement defined in claim 1 wherein
   said second corrugated end portion terminates in open feeder cell ends spaced from said one of said upstanding sidewalls and the adjacent longitudinal side rail; and including
   means for enclosing said open feeder cell ends and that open top of said first corrugated end portion residing between said one of said upstanding sidewalls and said open feeder cell ends.

6. The improvement defined in claim 5 wherein said first corrugated end portion terminates in open transverse raceway ends remote from said one of said upstanding sidewalls; and including
means for capping said open transverse raceway ends.

7. The improvement defined in claim 1 wherein said corrugated member includes spaced crests, intervening valleys and inclined sidewalls connecting adjacent crests and valley, said spaced crests engaging said flat web and being secured thereto.

8. In electrical wiring distributing apparatus for a concrete floor construction, said apparatus including a trench header having a base pan, vertically adjustable longitudinal side rails, and access cover plates spanning the distance between said longitudinal side rails, said base pan having a generally U-shaped configuration including a flat web and upstanding sidewalls, the improvement comprising:
- a corrugated member disposed beneath said base pan and cooperating with said flat web to form transverse raceways extending transversely of said trench header, said corrugated member presenting first corrugated end portions each projecting beyond one of said upstanding sidewalls and each being open at its top;
- feeder cellular raceway units, one positioned on each side of said base pan, each of said feeder cellular raceway units having a plurality of spaced-apart generally parallel feeder cells extending laterally away from said trench header in aligned relation with said transverse raceways, said feeder cellular raceway units presenting second corrugated end portions open at their bottoms and each overlapping one of said first corrugated end portions;
- said feeder cellular raceway units and said base pan of said trench header lying at a common level; and
- said flat web having at least one opening providing communication from the interior of said trench header, through the subjacent one of said transverse raceways and into the corresponding feeder cells.

References Cited

UNITED STATES PATENTS

| | | | |
|---|---|---|---|
| Re. 17,290 | 5/1929 | Ashley | 52—221 |
| 1,530,200 | 3/1925 | Richardson et al. | 52—221 |
| 1,626,570 | 4/1927 | Walker | 52—221 X |
| 1,782,779 | 11/1930 | Fullman | 52—221 |
| 1,893,268 | 1/1933 | Boucher | 52—221 X |
| 2,089,893 | 8/1937 | Greulich | 52—221 X |
| 2,445,197 | 7/1948 | Wiesmann | 52—221 |
| 3,204,378 | 9/1965 | Stuessel et al. | 52—221 |
| 3,262,238 | 7/1966 | Fork | 52—221 |

FOREIGN PATENTS 659,866  3/1963  Canada.

FRANK L. ABBOTT, *Primary Examiner.*

A. C. PERHAM, *Assistant Examiner.*

U.S. Cl. X.R.

174—49; 285—64